US006173049B1

(12) United States Patent
Malik

(10) Patent No.: US 6,173,049 B1
(45) Date of Patent: *Jan. 9, 2001

(54) SYSTEM AND METHOD FOR AUTOMATED PROVISION AND CUSTOMER SELECTION OF TEMPORARY CALLER IDENTIFICATION SERVICES

(75) Inventor: Dale W. Malik, Atlanta, GA (US)

(73) Assignee: Bellsouth Intellectual Property Corporation, Wilmington, DE (US)

(*) Notice: Under 35 U.S.C. 154(b), the term of this patent shall be extended for 0 days.

This patent is subject to a terminal disclaimer.

(21) Appl. No.: 09/203,067

(22) Filed: Dec. 1, 1998

Related U.S. Application Data

(63) Continuation-in-part of application No. 08/908,068, filed on Aug. 11, 1997.

(51) Int. Cl.[7] .............................. H04M 3/42; H04M 1/57; H04M 7/00; H04M 15/06
(52) U.S. Cl. .......................... 379/207; 379/127; 379/142; 379/230
(58) Field of Search ..................................... 379/127, 142, 379/201, 207, 219, 220, 229, 230

(56) References Cited

U.S. PATENT DOCUMENTS

| | | |
|---|---|---|
| 4,860,335 | 8/1989 | Namekawa ........................ 455/415 X |
| 5,430,719 | 7/1995 | Weisser, Jr. ........................... 370/389 |
| 5,544,236 | 8/1996 | Andruska et al. .................... 379/201 |
| 5,734,710 | 3/1998 | Hirth et al. ....................... 379/201 X |
| 5,745,553 | 4/1998 | Mirville et al. .................. 379/201 X |
| 5,751,802 | 5/1998 | Carr et al. ............................ 379/201 |
| 5,933,484 | 8/1999 | Partridge, III ....................... 379/201 |

*Primary Examiner*—Harry S. Hong
(74) *Attorney, Agent, or Firm*—Nora M. Tocups; James L. Ewing, IV; Kilpatrick Stockton

(57) ABSTRACT

The disclosed system and method provide a customer with the ability to obtain temporary caller identification services in an Advanced Intelligent Network. The customer initiates the service by dialing a call to a feature access code and does not require the intervention of a service representative. The call by the customer is recognized as a request for caller identification service. On the basis of the recognition, an association is retained between the line number and the Service Switching Point serving the line number. This retained association may be used later in the activation of the temporary caller identification service for the requested line number. The call is routed to a rental service interface through which rental information from the caller may be collected. This rental information may be compiled into a rental agreement that is used as the basis for activation of the temporary caller identification services with respect to the requested line number. Optionally, confirmation of the activation of caller identification service is provided to the customer during the communication.

20 Claims, 6 Drawing Sheets

SYSTEM AND METHOD FOR AUTOMATED PROVISION AND CUSTOMER SELECTION OF TEMPORARY CALLER IDENTIFICATION SERVICES

CROSS-REFERENCE TO RELATED APPLICATIONS

This application is a continuation-in-part of U.S. patent application Ser. No. 08/908,068 entitled "System and Method for Automated Provision and Customer Selection of Temporary Advanced Intelligent Network Services," filed Aug. 11, 1997 and related U.S. patent application Ser. No. 09/116,167 entitled "System and Method for Notifying a Customer of a Call From a Particular Number" filed Jul. 16, 1998 which are incorporated by reference herein in their entirety.

FIELD OF THE INVENTION

This invention generally relates to the field of telecommunications. This invention particularly relates to the field of activation and provision of advanced services in an Advanced Intelligent Network (AIN). More particularly, this invention relates to the field of caller-activation of caller identification services on a temporary and/or remote basis.

BACKGROUND OF THE INVENTION

In the competitive market of telecommunication services, a customer may desire to augment his or her conventional telecommunication service with additional advanced services. Generally, an advanced service is a service that provides features or functions that are not usually provided within the local switching system. One particularly desirable advanced service is caller identification, commonly referred to as Caller ID. Presently, Caller ID service provides information about who is calling and/or the caller's phone number from the customer's phone between the first and second ring and requires that the customer's phone ring. Thus, the current system requires that the phone call be completed. It would be desirable to provide a system of caller identification service that captures caller identification data even if the customer's phone is busy, captures one hundred percent of incoming calls and operates independent of the state of the customer's line. It would also be desirable to provide customers with caller identification service on a remote and/or temporary basis.

Advanced services are relatively complex, require coordination of multiple systems and are typically implemented through the use of data communications between or among network elements. Presently, to obtain advanced services, the customer must have a predefined relationship with a telecommunication service provider. A predefined relationship is required whether the telecommunication services are switch-based or whether the telecommunication services are provided by an AIN. In a switch-based system, the predefined relationship is a requirement because many services for a customer are implemented directly at the switch that serves the customer's calling line. More particularly, in a switch-based system, a block of information with respect to a customer's services is stored in the switch that serves the customer's calling line. This block of information is stored in the switch because of administration, control and billing reasons. Thus, for a customer to obtain a service, the customer has to contact the service provider to pre-register for the service. The service provider then takes steps to specially and individually configure the block of information required to enable the customer's services in the switch that serves the customer's calling line. Thus, in a switch-based system, the predefined relationship between the customer and service provider provides that the switch serving the customer's calling line include a block of information relating to the services of the customer.

In an AIN, the predefined relationship between the customer and a service provider is also a requirement for advanced services, but for different reasons than in the switch-based system. In contrast to a switch-based system, in an AIN, information with respect to the advanced services of a customer is not stored directly at the switch that serves the. customer's calling line. Rather, in an AIN, information with respect to a customer's advanced services is generally stored at an AIN element other than the Service Switching Point (SSP) which serves as or in conjunction with a switch in the AIN. Usually, the AIN element that stores the information is a centralized AIN element such as a Service Control Point (SCP) that may be accessed via data communications by multiple SSPs. Typically, such information is stored in a database or a table associated with a Service Package Application (SPA) that may be located at the SCP. The SCP may be queried via a data communication by an SSP for processing instructions with respect to the implementation of advanced services for a communication to or from a customer's calling line that is served by the SSP. Upon receipt of the query, the SCP consults the appropriate databases or the appropriate tables and provides a response via another data communication to the SSP. This response includes processing instructions that are carried out by the SSP. In some cases, a Service Circuit Node (SCN) may be consulted by the SCP or otherwise used in providing the advanced services.

Thus, in an AIN, the predefined relationship between the customer and the service provider provides that an SCP include an entry of information relating to advanced service to the customer. Also in an AIN, the predefined relationship between the customer and the service provider provides for the appropriate mechanisms to reach the entry of information relating to the advanced service to the customer. These mechanisms operate such that an SSP that serves a customer's calling line having advanced services queries via data communication the appropriate SCP for call processing instructions. The SSP then carries out the instructions received in a response via data communication from the SCP.

FIG. 1 is a block diagram that is used to illustrate the steps that are presently taken in order to bring about the predefined relationship between a customer and a service provider in an AIN. As noted, the predefined relationship must exist in order to presently obtain advanced services in an AIN. Customer 1, who desires to obtain an advanced service, contacts a sales/service representative 2 of the customer's telecommunication service provider. The sales/service representative 2 engages the customer in a dialogue and obtains information from the customer with respect to advanced services. The sales/service representative 2 then enters this information into a service order system 3. The service order system 3 accesses the information to derive further information with respect to billing issues, to set up an entry of information with respect to the customer's advanced service, and to provide for the appropriate mechanisms to reach the entry of information.

From the service order system 3, the appropriate information or instructions based thereon are distributed as appropriate to a billing system 4, a Service Management System (SMS) 5, and a Mechanized Administration and Recent Change (MARCH) 6. The billing system 4 uses the information or instructions to set up and carry out billing to the customer for the advanced service. The SMS 5 distributes the information or instructions as appropriate to a Service Circuit Node (SCN) 7 and/or a Service Control Point (SCP) 8. The information is incorporated as an entry of information relating to the advanced service to the customer. Typically, this entry of information is stored in a database or a table associated with an appropriate Service Package Application (SPA). As noted above, this entry of information is part of the predefined relationship between the customer and the service provider. The MARCH 6 also further distributes the information or instructions, but the MARCH 6 distributes the information or instructions to an appropriate SSP 9 so that the appropriate mechanisms are set up at the SSP 9 to enable the SSP 9 to communicate with the SCP 8 and obtain instructions based on the entry of information. As also noted above, these appropriate mechanisms are part of the predefined relationship between the customer and the service provider.

The manner of establishing the requisite predefined relationship with a customer in a switch-based system or an AIN has posed problems to telecommunication service providers. One problem is that a customer is unable to obtain an advanced service without the execution of the lengthy and complex procedures described above that are necessary to set up a predefined relationship. These lengthy and complex procedures preclude a customer from directly setting up his or her own advanced services. These lengthy and complex procedures also preclude the short term implementation or "rental" of advanced services. In addition, these lengthy and complex procedures preclude the implementation of advanced services on short notice. In other words, it is generally impossible to be a "walk-up" customer of advanced services. Thus, it would be desirable to provide a system of providing caller identification services that facilitate the provision of temporary and/or remote caller identification services on short notice.

With respect to switch-based systems, a solution to the problems of allowing a customer to directly set up his or her own switch services, of renting these services for a short term, and of implementing them on short notice has been proposed. in U.S. Pat. No. 5,544,236 to Andruska et al. As noted above, in a switch-based system, a block of information with respect to a customer's advanced services is stored in the switch that serves the customer's calling line. Andruska et al describes a feature processor as part of the local switching system for use in connection with this block of information in the switch. In response to a call from a customer, the feature processor may be used to effectively change the block of information relating to the customer's service map that is stored in the switch.

The solution proposed by Andruska et al. does not solve the problem of the lengthy and complex procedures for the set up of a predefined relationship in a switch-based system. Andruska et al. does not solve this problem because Andruska et al. does not address the problem of creating a predefined relationship. In Andruska et al., in order for a customer to access the feature processor to set up or change advanced services, the customer has to already have a predefined relationship and associated data block with the service provider. In other words, the block of information with respect to the customer must be present in order for Andruska et al.'s system to work to set or change the services available. Andruska et al. does not provide for the establishment of the predefined relationship, but rather, supplements a predefined relationship that is already in existence.

Further, Andruska et al. does not present any solution for an AIN. As noted, Andruska et al. does not solve the problem of the lengthy and complex procedures for the set up of an AIN service. In addition, Andruska et al. does not present any solution for an AIN because Andruska et al. is directed to a switch-based system. Thus, the solution offered by Andruska et al. is inapplicable to an AIN.

More particularly explained, as noted above, the differences between switch-based system and an AIN result in differences in the type of redefined relationship that must be established with a customer in order to provide services. In an AIN, the predefined relationship requires an entry of information relating to the advanced service of the customer in a centralized AIN element such as an SCP that may be accessed via data communications by multiple SSPs. Andruska et al.'s proposed solution works on the premise that the block of information relating to a customer's advanced services is stored in the switch serving the customer's calling line. Thus, Andruska et al.'s proposed solution is inapplicable to an AIN.

In addition, in an AIN, the predefined relationship also requires that appropriate mechanisms be set up so that the entry of information relating to the advanced service of the customer that are stored in the centralized AIN element may be accessed from an SSP. As noted, Andruska et al.'s proposed solution works on the premise that the block of information relating to a customer's services is stored in the switch serving the customer's calling line and merely toggles access to preexisting services. There is no need in Andruska et al.'s proposed solution for a mechanism to reach an entry of information that is stored in a different element that must be accessed from the switch. Andruska et al.'s proposed solution does not disclose such a mechanism. Thus, Andruska et al.'s proposed solution is inapplicable to an AIN.

The problems faced in an AIN have not been solved with respect to the activities of customer selection and activation of advanced services, delivery of short term or rental of advanced services, and implementation of such advanced services on short notice. They have not been solved because the manner in which the predefined relationship must be established between a customer and a service provider precludes these activities. In particular, the manner in which an entry of information for a customer in a centralized AIN element is set up and the manner in which mechanisms are set up to access that entry of information have been stumbling blocks to the referenced activities.

As noted, the first of these stumbling blocks is the manner in which an entry of information is set up for a customer in a centralized AIN element. This task has been a stumbling block for several reasons. As explained above in connection with FIG. 1, presently in an AIN, the entry of information for a customer is accomplished by the following several steps. These steps include the receipt of information by the sales/service representative 2, input of such information into the service order system 3, transmission of the information to the Service Management System (SMS) 5, and then finally further distribution of the information to a Service Circuit Node 7 or Service Control Point 8. Although this process is necessary, it is a process that requires human intervention through the use of a sales/service representative, takes a relatively long time, includes quite a few steps, and otherwise generally slows down the implementation of advanced services for a customer.

Although this process of providing an entry of information at the centralized AIN element is lengthy, the entry of information is limited to information relating to the particular advanced service to be provided to the customer. This entry of information does not correlate the customer and their directory number (calling line) to any particular Service Switching Point (SSP) or other AIN element that serves the customer. Further, neither the SCP nor the SCN maintains any type of correlation table or database between customers' calling lines and the respective SSPs serving the calling lines. In other words, an SCP does not know which SSP serves which customer's calling line. When providing an SSP with processing instructions in response to a query, the SCP addresses the response based on information that is included in the query. The query/response exchange defines the relationship in communications between the SSP and the SCP. The SCP does not otherwise keep any correlative information between a customer's calling line and its serving SSP.

This lack of correlative information at the SCP is another problem in delivering customer selection and activation of advanced services, the rental of advanced services, and the implementation of advanced services on short notice. An entry of information may be provided at the SCP, but unless the SCP receives a query from the SSP serving the customer's line, it is unable to initiate a service without knowing which SSP to contact. Without this correlation, advanced services may not be applied to the customer's calling line because these advanced services are enabled through the SSP serving the customer's calling line. In other words, the SCP may have an entry of information for a customer that provides instructions for advanced services, but the SCP does not itself have any information with respect to a place to send the instructions relating to the enablement of the advanced services. This is a problem because the customer does not receive his or her desired advanced services.

Further, the lack of correlative information at a centralized AIN element such as an SCP or an SCN between the customers' calling lines and the respective SSPs that serve these calling lines is not a problem in a switch-based system. As explained above, in a switch-based system, a block of information with respect to a customer's services is stored in the switch that serves the customer's calling line. No other element generally is consulted with respect to the implementation of services for a customer's calling line other than the switch serving the calling line. Thus, there is no need for keeping track of which switch serves which calling lines in a switch-based system.

As referenced briefly above, there is at least one other stumbling block to the provision of customer selection and activation of advanced services, delivery of short term or rental of advanced services, and implementation of such advanced services on short notice. This stumbling block is the manner in which mechanisms are set up to access the entry information relating to a customer that is stored in a centralized AIN element from an SSP. This task also has been a stumbling block for several reasons. As explained above in connection with FIG. 1, presently in the AIN, the appropriate mechanisms necessary to reach the entry of information at the SCN or the SCP are set up through parallel steps to the storage of the entry of information. The mechanisms are set up generally through a series of steps. These steps include the receipt of the information by the sales/service representative 2, input of such information into the service order system 3, transmission of the information to MARCH provisional system 6, and then finally further distribution of the information to an appropriate Service Switching Point (SSP) 9.

This task of providing mechanisms is important because without mechanisms at the appropriate SSP to provide access to the entry of information relating to the customer, there is no link then between the customer's calling line and the entry of information stored in the centralized AIN element. As noted above, neither the SCP nor the SCN maintains any type of correlation table or database between customer's calling lines and the respective SSPs serving the calling lines. Thus, these mechanisms are the only link between the SSP serving a customer's calling line and the instructions that are contained in the entry of information in the centralized AIN element that pertain to the implementation of advanced services with respect to a customer's calling line. Although the mechanisms are necessary, the manner in which these mechanisms are set up presently requires human intervention through the use of a sales/service representative, takes a relatively long time, includes quite a few steps, and otherwise generally slows down the implementation of advanced services for a customer.

One advanced service that is not presently available on a temporary basis is a temporary caller identification service, including, but not limited to, a caller identification system, preferably an audible caller identification system, that audibly announces the number and/or name associated with an incoming call. For example, a customer may desire to ascertain the number and/or name associated with incoming calls to the customer's calling line. In the prior art, a customer was required to purchase and install caller identification equipment and was limited by the location of the equipment. Thus, the caller needed to purchase and install in advance caller identification equipment for the customer's calling.

Accordingly, there is a need for a method and a system that provides for the provision of customer selection and the activation of caller identification services, delivery of short term or rental of caller identification services, and implementation of such caller identification services on short notice in an Advanced Intelligent Network (AIN).

There is also a need for a method and a system that provides for the application of caller identification services in an AIN to a customer's directory number or calling line without the necessity of the customer having a predefined relationship with a telecommunication service provider with respect to the caller identification services.

There is an additional need for a method and a system that provides for the application of caller identification services in an AIN to a customer's directory number or calling line without the necessity of a service representative carrying out administrative tasks with respect to the customer.

There is yet another need for a method and a system that provides caller identification services while the customer is on the phone line, does not require that the phone ring and desirably captures and identifies all incoming calls.

In addition, there is a need for a method and a system that provides for the entry of information relating to a customer's caller identification services in a centralized AIN element in a manner that avoids human intervention by a sales/service representative, that is accomplished quickly with few steps, and that minimally impedes the implementation of caller identification services for a customer.

Also, there is a need for a method and a system that provides for caller identification services to a customer without requiring the purchase, rental or installation of caller identification equipment by the customer.

SUMMARY OF THE INVENTION

The present invention is directed to a caller-activated rental system for temporary and/or remote caller identification services and methods and systems therefor in the Advanced Intelligent Network (AIN). An overview of the invention is described, through the use of the following exemplary embodiment. A customer interested in obtaining on short notice or renting temporary, advanced telecommunication services initiates the process for obtaining caller identification services by placing a call to a feature access code. The call is routed to a rental service interface through which rental information from the caller may be collected. Rental information is compiled into a rental agreement that is used as the basis for activation of the advanced telecommunication services, including caller identification, with respect to the caller's calling line.

Advantageously, by this invention, a customer does not need to have a predefined relationship with a service provider in order to obtain advanced services, particularly temporary caller identification service. Also by this invention, the stumbling blocks to the short term and short notice implementation of caller identification services in an AIN is overcome. This invention provides an effective manner for the entry of information for a customer in a centralized AIN element. This effective manner includes the creation of a rental agreement based on a customer's selections of caller identification services and storage of the rental agreement in a centralized AIN element. No prior entry of information relating to the customer need be stored in the AIN element.

Embodiments of this invention also provide an effective manner in which mechanisms are set up to access the rental agreement so as to apply the caller identification services based on the customer's selections. This effective manner includes retention of an association between the calling line number and the Service Switching Point (SSP) serving the calling line number at an early stage in the processing of the communication. This retained association is used later to access the rental agreement in the activation of caller identification service for the calling line number. Thus, the customer does not have to contact a sales or service representative of a telecommunication service provider to set up and activate caller identification service. Rather, the customer may place a call whenever the customer desires to activate caller identification service. Advantageously, the caller-activated rental system may be activated independently by the customer with little or no notice. Additionally, the system is easy to use, efficient, and makes good use of network resources.

Stated more particularly, the present invention includes methods such as the following exemplary method of providing a caller-activated rental system for caller identification service. Pursuant to this exemplary method, in response to receiving a communication directed to a feature access code from a calling line number, a check is conducted to determine whether a rental agreement is in place with respect to the calling line number of the communication. If there is no rental agreement in place, then an inquiry is made of the communication for rental information regarding caller identification service for the calling line number. In response to the inquiry, rental information is received and a rental agreement is created. If there is a rental agreement in place, then an inquiry may be made of the communication for a change in rental information regarding the caller identification service for the calling line number. In response to the inquiry, a change in the rental information or rental agreement may be received and such change entered. Based on the rental agreement, an activation or a change in the activation of the caller identification service for the calling line number is be made. After making the activation or the change in the activation, confirmation thereof is provided to the communication.

The present invention also includes systems such as the caller-activated rental system for temporary caller identification telecommunication service in the AIN. Pursuant to this exemplary system, an AIN element such as a Service Control Point (SCP) or other such element carries out several operations. This AIN element is operative to make a recognition of a communication as a request for an initiation of a caller identification service with respect to a calling line number on the basis of use of a feature access code to which the communication is directed. On the basis of the recognition, the AIN element retains an association between the calling line number and a switch serving the calling line number. This retained association may be used later in the activation of the temporary advanced telecommunication services including caller identification service for the calling line number. In response to the recognition of the communication as a request for an initiation of a caller identification service, the AIN element is operative to direct the collection of rental information regarding the caller identification service for the calling line number. The AIN element is operative to receive rental information and may be operative to direct creation of a rental agreement regarding the caller identification service for the calling line number. Preferably, the rental agreement is based on the rental information. On the basis of the rental information or the rental agreement, the AIN element is operative to direct activation of the caller identification service for the calling line number. Finally, the AIN element is further operative to provide confirmation to the communication of the activation of the caller identification service for the calling line number.

Another exemplary system of the present invention includes operations that are carried out by a first AIN element such as a SCP and a second AIN element such as a Service Circuit Node (SCN). Pursuant to this exemplary system, the first AIN element is operative to make a recognition of a communication as a request for an initiation of a caller identification service with respect to a calling line number on the basis of use of a feature access code to which the communication is directed. The first AIN element is operative, on the basis of the recognition of the communication, to retain an association between the calling line number and a switch serving the calling line number. The first AIN element is further operative to use this association in the activation of the caller identification service for the calling line number. The first AIN element also is operative to direct collection by a second AIN element from the communication of rental information regarding the caller identification service for the calling line number.

In this exemplary system, the second AIN element is functionally connected to the first AIN element. The second AIN element is operative to make the collection from the communication of the rental information regarding the caller identification service for the calling line number. The second AIN element may be further operative in response to collection of the rental information, to prepare a rental agreement regarding the caller identification service for the calling line number. In addition, the second AIN element may be operative to provide the first AIN element with the rental agreement instead of the rental information. The second AIN element also is operative to provide the rental information to the first AIN element.

In this exemplary system, in response to receipt of the rental information, the first AIN element is further operative to make an activation of the caller identification service for the calling line number. The first AIN element is further operative to provide confirmation to the second AIN element of the activation of the caller identification service for the calling line number. The second AIN element then is further operative to receive the confirmation from the first AIN element of the activation of the caller identification service for the calling line number and to provide the confirmation to the communication.

The present invention includes another system that includes AIN elements such as a Service Switching Point (SSP), an SCP and an SCN. Pursuant to this exemplary system, the SSP is operative to receive a communication directed to a feature access code from a calling line number. On the basis of the feature access code, the SSP is operative to pause in the processing of the communication and to request instructions regarding the communication from the SCP. The SCP is functionally connected to the SSP and is operative to retain an association between the calling line number of the communication and the SSP. The SCP also is operative to make a recognition that the communication is to be routed to a SCN. In response to the recognition, the SCP is operative to provide the instructions to the SSP to route the communication to the SCN. The switch then is operative, in response to receipt of the instructions, to route the communication to the SCN.

In this exemplary system, the SCN is functionally connected to the SSP and to the SCP. The SCN is operative, in response to receipt of the communication, to make a request for processing instructions from the SCP. The SCP is further operative, in response to the request, to provide the SCN with the processing instructions. The processing instructions include a direction to the SCN to make a collection from the communication of rental information regarding a caller identification service for the calling line number. The SCN may be further operative, in response to the processing instructions, to make the collection from the communication of rental information. In response to the collection of the rental information, the SCN is operative to prepare a rental agreement regarding the caller identification service for the calling line number. The SCN then may provide either the rental information or the rental agreement to the SCP. The SCP is further operative to receive the rental agreement or the rental information. On the basis of the rental agreement or the rental information, the SCP is operative to provide the SSP with activation instructions. The activation instructions include an order to the SSP to make an activation of the caller identification service for the calling line number. The SSP then is operative, in response to the activation instructions, to make the activation of the caller identification service for the calling line number. After activation, the SCP may be further operative to provide confirmation to the SCN of the activation of the caller identification service for the calling line number. The SCN is further operative to receive the confirmation from the SCP of the activation of the caller identification service for the calling line number and to provide the confirmation to the communication.

The present invention includes yet another system with respect to keeping track of a calling line number and its serving SSP. Pursuant to this exemplary system, an AIN such as an SCP is operative to receive information from a SSP. The information relates to a communication received at the SSP and the communication having a calling line number that is served by the SSP. On the basis of the information, the AIN element is operative to make a recognition of the communication as indicating a request for a service such as caller identification service. Alternatively, the AIN element may make a recognition of the communication as indicating the request for the service on the basis of use of a feature access code in association with the communication. On the basis of the recognition, the AIN element is operative to retain an association between the calling line number and the SSP serving the calling line number. The AIN element is further operative to retain the association between the calling line number and the SSP serving the calling line number for a predetermined length of time. The AIN element is further operative, after expiration of the predetermined length of time, to erase the association between the calling line number and the SSP serving the calling line number. Through use of this exemplary system, the association between the calling line number and the SSP may be used in the provision of the service.

The present invention is disclosed in the context of exemplary embodiments that include caller-activated rental systems for temporary caller identification services and methods therefor. Those skilled in the art will appreciate that the principles of the present invention may be applied to virtually any type of telecommunication network which incorporates distributed call processing control.

Therefore, it is an object of the present invention to provide a caller-activated rental system for temporary caller identification services in an Advanced Intelligent Network (AIN) and methods therefor.

It is also an object of the present invention to provide a method and system that allows for the application of one or more advanced services, including caller identification service, in an AIN to a customer's calling line number on short notice and for a short term rental period.

It is an additional object of the present invention to provide a method and system for the application of one or more caller identification services in an AIN to a customer's calling line without the necessity of the customer having a predefined relationship with a telecommunication service provider with respect to the caller identification service.

It is further an object of the present invention to provide for a method and system that allows for the application of one or more caller identification services in an AIN to a customer's calling line number through a call from a caller on the customer's calling line.

In addition, it is an object of the present invention to provide a method and system that allows for the application of one or more caller identification services in an AIN to a customer's calling line without the necessity of a sales/service representative carrying administrative tasks with respect to such set-up for a customer.

Further, it is an object of the present invention to provide a method and system that allows an AIN element to keep track of a calling line number and its serving SSP by creating an association between a calling line number and the SSP when a communication is recognized as indicating a request for a caller identification service.

In addition, it is an object of the present invention to provide a method and system that provides for the entry of information relating to a customer's caller identification services in a centralized AIN element in a manner that avoids human intervention by a sales/service representative, that is accomplished quickly with few steps, and that minimally impedes the implementation of caller identification services for a customer.

Also, it is an object of the present invention to provide a method and system that provides for the set up of mechanisms in an AIN to access the entry of information relating to a customer that is stored in a centralized AIN element and that avoids human intervention by a sales/service representative, that is accomplished quickly with few steps, and that minimally impedes the implementation of caller identification services for a customer.

That the present invention and the exemplary embodiments thereof overcome the problems and drawbacks set forth above and accomplish the objects of the invention set forth herein will become apparent from the detailed description of exemplary embodiments which follows.

DETAILED DESCRIPTION

The present invention is directed to a caller-activated rental system in the Advanced Intelligent Network (AIN) for caller identification services and methods therefor. The particular embodiments described herein are intended in all respects to be illustrative rather than restrictive. Alternative embodiments will become apparent to those skilled in the art to which the present invention pertains without departing from its spirit and scope.

Figure 1:
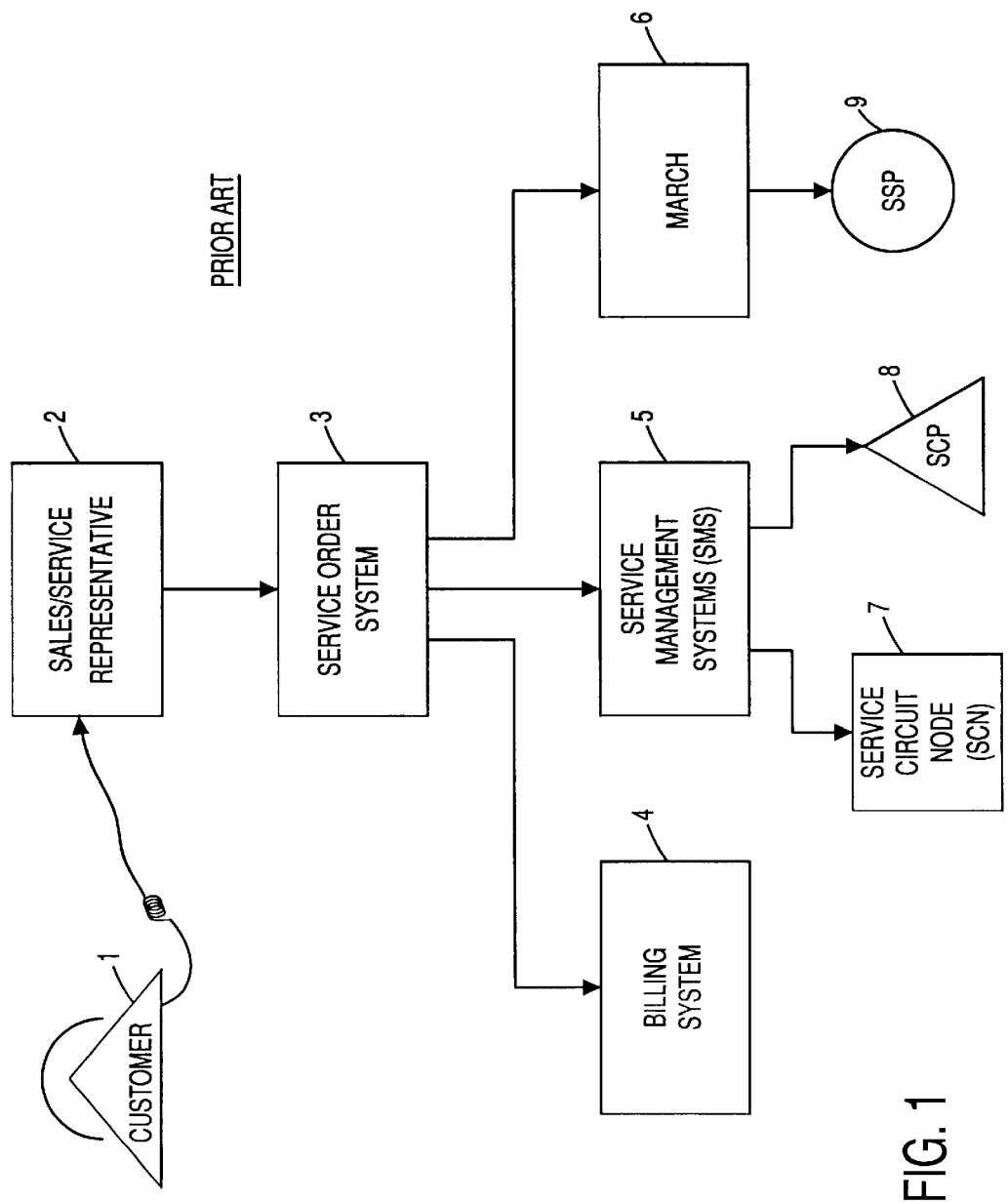
FIG. 1 is a block diagram illustrating the steps in bringing about a predefined relationship between a customer and a service provider in the AIN.
Figure 2:
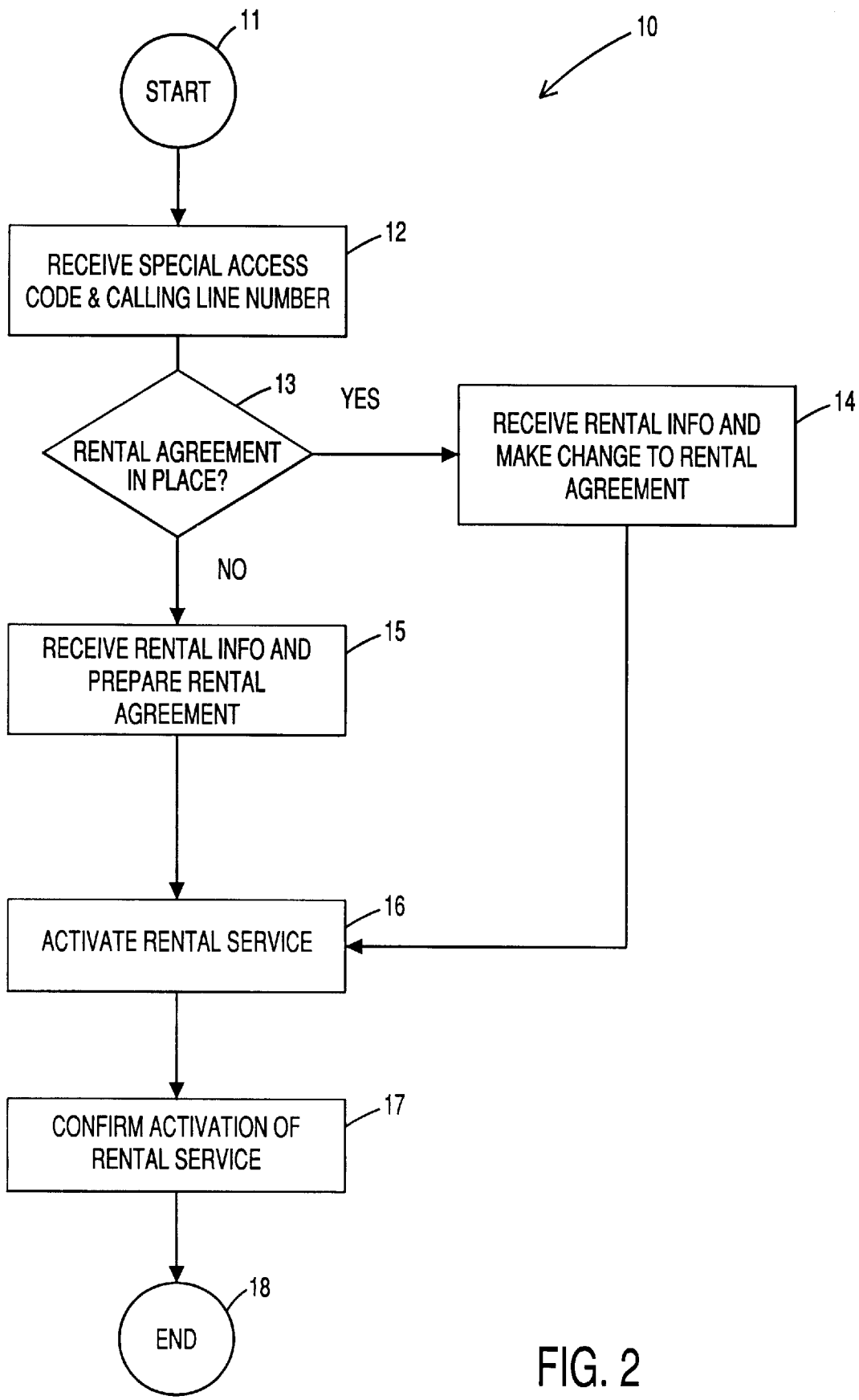
FIG. 2 is a flow diagram illustrating an exemplary method of operation of the present invention.
Figure 4:
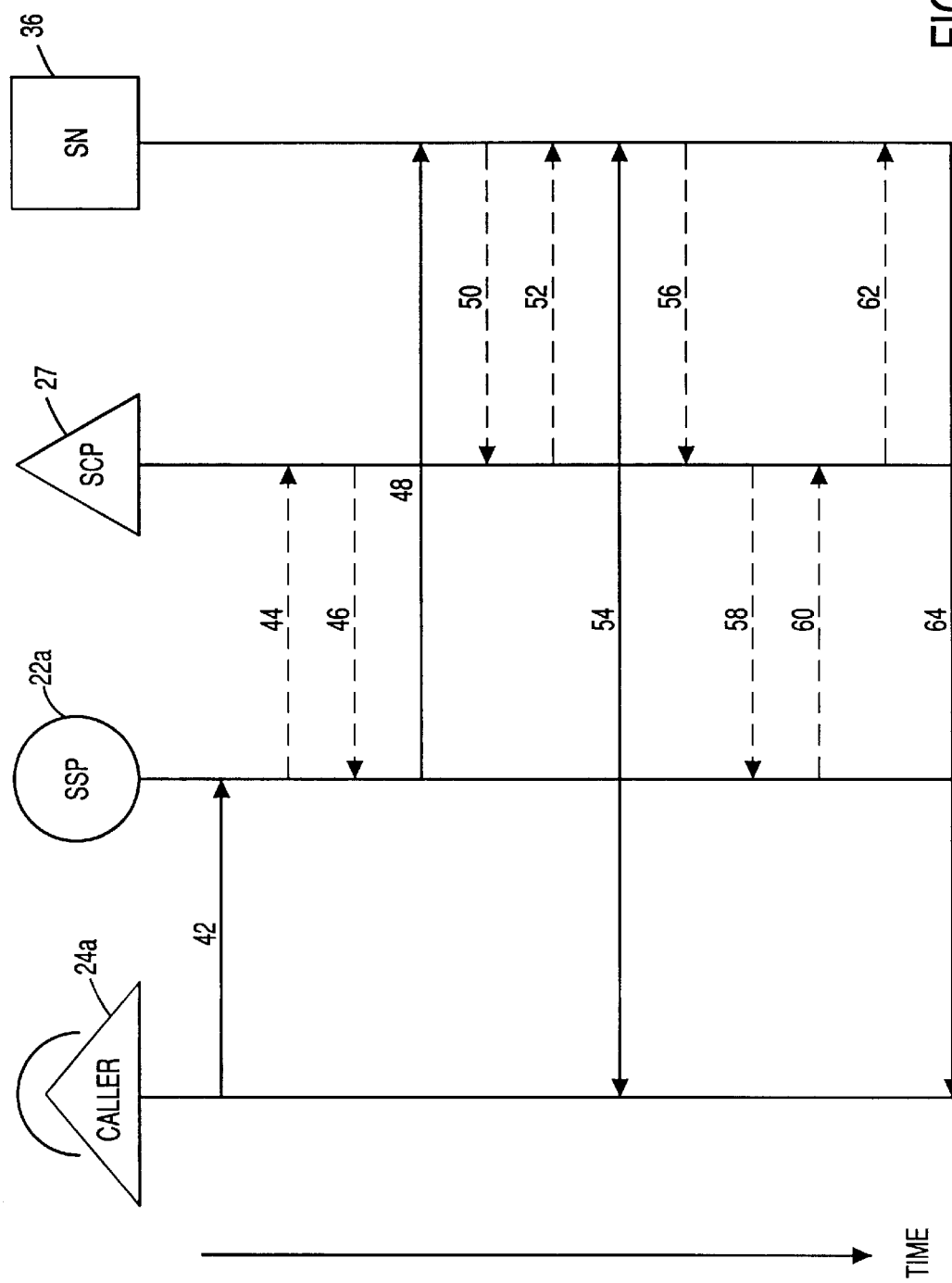
FIG. 4 is a timing/block diagram illustrating an exemplary method of operation of the present invention.

This detailed description first provides an overview of an exemplary embodiment of the present invention by reference to the flow diagram of FIG. 2. The overview is followed by a description of exemplary provisioning of the present invention in an exemplary environment. In other words, the exemplary provisioning description provides an explanation of the set-up of an exemplary embodiment through the preferred provisioning of a Service Switching Point (SSP) with Public Office Feature Code (POFC) triggers and Termination Attempt Triggers (TAT). After this exemplary provisioning description, a description of an exemplary operation of an exemplary embodiment of the present invention in connection with an exemplary environment is illustrated in FIG. 4. This description of exemplary operation includes examples illustrating a customer renting caller identification service, a customer initiating the termination of the rental of caller identification service, and termination of caller identification service based on expiration of a rental agreement. The term "customer" as used herein is intended to include any person that may benefit from the data stored by the system and is not necessarily limited to persons paying for the services described herein. Throughout the drawings and following description, like numerals indicate like elements.

Overview of an Exemplary Embodiment

Generally, the present invention provides a caller identification system in an Advanced Intelligent Network (AIN) for caller identification services and methods therefor. For purposes of convenience, a "caller identification service" may also be referred to as a caller ID service herein.

FIG. 2 is a flow diagram illustrating an exemplary method 10 of operation of the present invention. A customer or customer initiates the process of requesting caller identification service by contacting and communicating with the service in start step 11. After start step 11, in step 12, a feature access code and a calling line number are received in connection with the communication. Generally, the communication is directed to the feature access code and is placed on a calling line associated with the calling line number. By direction of the communication to the feature access code, the caller has provided an indication of a request for advanced service, including caller identification service. As used herein, the term "calling line" is used synonymously with the term "calling line number" unless a distinction is otherwise noted. Thus, a customer, who is interested in receiving caller identification services temporarily without the otherwise necessary purchase of equipment, for example while he or she is on vacation, can place a call to the feature access code by using a telephone associated with the calling line number to which the caller identification service is to be provided.

In step 13 of FIG. 2, a check is made to determine whether a rental agreement is in place with respect to the calling line number of the communication, e.g. the permanent, home number of the caller. The customer may have already established a rental agreement for advanced services and may be calling to renew or revise the established rental agreement. If a rental agreement is in place, then in step 14, additional rental information or a change in the rental information is received and the addition or change is made to the rental agreement. On the other hand, if a rental agreement is not in place, then in step 15, rental information is received and a rental agreement is prepared. For example, the customer may be a first time customer of this caller-activated rental system for temporary caller identification services and other advanced services. After step 14 of making an addition or change to a rental agreement or after step 15 of preparing a rental agreement, in step 16, the rental service is activated based on the rental agreement. For example, a trigger may be provisioned in the customer's Service Switching Point (SSP) such that calls to the line to which the caller identification service is provided are received and identified including but not limited to while the customer is on the line, or otherwise unavailable. In step 17, the activation of the rental service is confirmed. Confirmation may include the customer receiving an announcement that the caller identification service has been set up and identification of the line number to which the service is to be provided. After confirmation, the exemplary method of requesting and initiating caller identification service ends in step 18.

Advantageously, the exemplary method allows a customer to rent selected caller identification services, "rental service," on short notice and for a short term. Further, the exemplary method allows the customer to activate the service with a minimum of time and effort and minimum interaction with a telecommunication service provider and without the purchase, rental or installation of additional equipment, such as a caller ID box. Additional advantages of the present invention are discussed below and will become apparent to those skilled in the art.

Exemplary Operation of an Exemplary Embodiment in an Exemplary Environment

Overview of AIN elements

Figure 3:
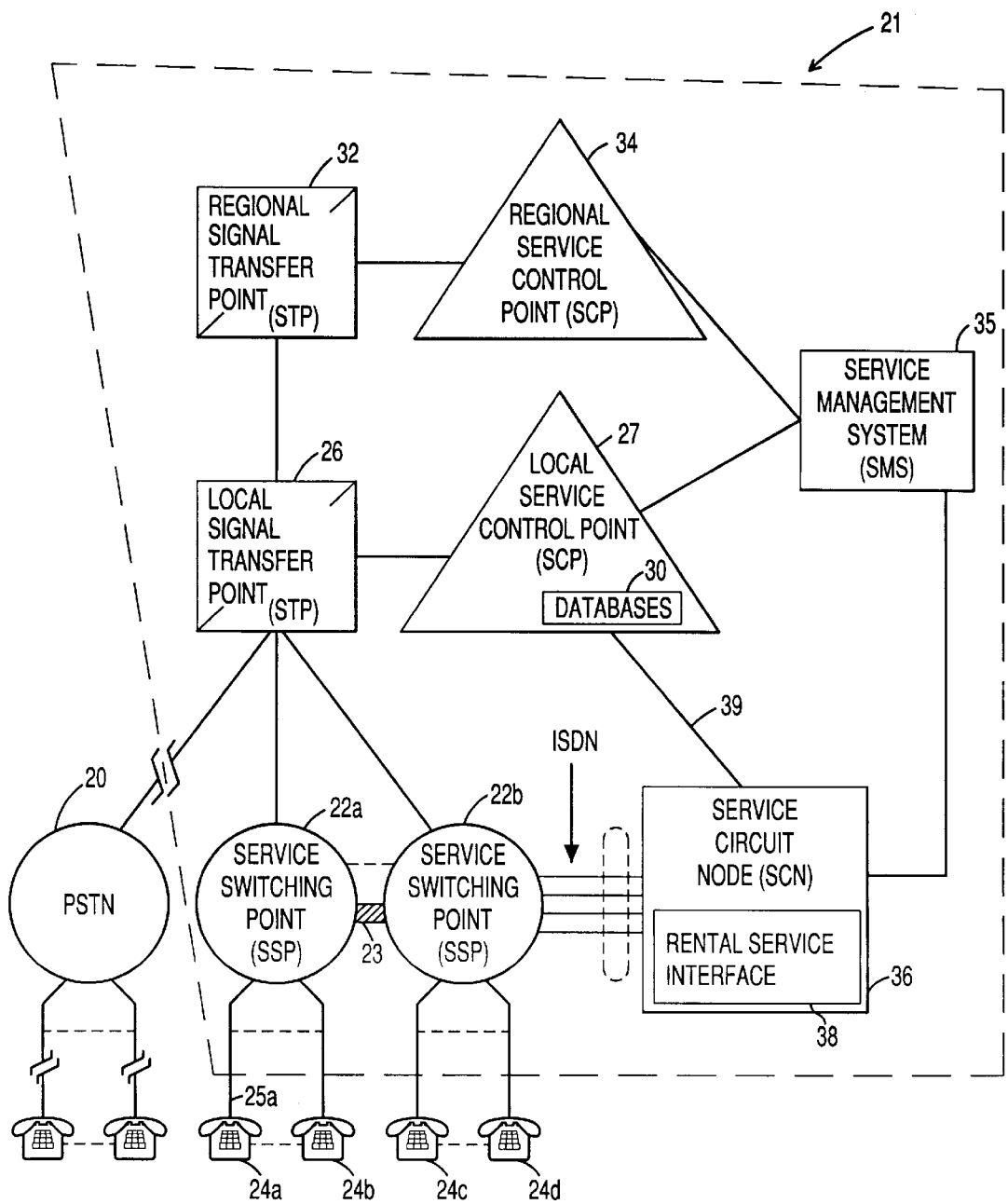
FIG. 3 is a diagram of an exemplary embodiment and exemplary environment for operation of the present invention.

FIG. 3 is a diagram of an exemplary embodiment and an exemplary environment for operation of the present invention. Connected to the Public Switched Telecommunication Network (PSTN) 20, an exemplary environment is an Advanced Intelligent Network (AIN) 21. For brevity, only a basic explanation of the AIN 21 is provided herein. Where the AIN 21 differs from that which would be understood by those skilled in the art, additional details are provided herein. For further information regarding the referenced AIN 21 and aspects thereof, the interested reader is referred to U.S. Pat. No. 5,430,719 to Weisser, which is incorporated herein by reference in its entirety.

The AIN 21 includes a variety of interconnected network elements. A group of such network elements includes a plurality of central offices which are indicated as Service Switching Points (SSPs) 22a and 22b shown in FIG. 3. An SSP typically includes switch functionality, but also includes other functionality so as to communicate with other AIN elements as those skilled in the art understand. As further illustrated in FIG. 3, the SSPs 22a and 22b have a plurality of subscriber lines connected thereto. A subscriber line may also be referred to as a calling line. Each SSP serves a designated group of calling lines, and thus, the SSP that serves a particular calling line may be referred to as its serving SSP. Each calling line is typically connected to a piece of terminating equipment including a plurality of telephones commonly referenced as 24 and individually referenced as 24a, 24b, 24c and 24d in FIG. 3. Although telephones are illustrated as the pieces of terminating equipment in FIG. 3, those skilled in the art will understand that such pieces include other telecommunication devices such as facsimile machines, computers, modems, etc.

Currently, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

Referring again to FIG. 3, SSPs 22a and 22b are interconnected by a plurality of trunk circuits 23. These are the voice path trunks that interconnect the SSPs to connect communications. The term "communication" or "call" is used herein to include all messages that may be exchanged between caller and called party in a network such as the network illustrated in FIG. 3.

Each of the SSPs 22a and 22b is connected via respective data links to another AIN element referred to as a local Signal Transfer Point (STP) 26. Currently, these are data links employing a signaling protocol referred to as Signaling System 7 (SS7). Much of the intelligence of the AIN resides in yet another type of AIN element referred to as a local Service Control Point (SCP) 27 that is connected to the STP 26 over a SS7 data link. Among the functions performed by the SCP 27 is the maintenance of network databases and subscriber databases as represented collectively by databases 30. These databases may be used in providing temporary advanced telecommunication services to a customer. Typically, the SCP 27 is also the repository of Service Package Applications (SPAs) that are used in connection with or as part of the databases 30 in the application of advanced telecommunication services or enhanced features to calling lines.

As used herein, the phrase "advanced telecommunication services" refers to features or enhancements that are provided by a telecommunication service provider to a customer in addition to conventional telephone service through the PSTN. The phrase "temporary caller identification services" refers to caller identification services that may be "rented" to a customer for a limited time such as in connection with the present invention. In contrast, a telecommunication service to which a customer subscribes in a conventional manner (rather than "rents") is typically subscribed to on an open-ended basis so long as the customer pays for the service. Examples of temporary advanced telecommunication services include but are not limited to flexible call forwarding service, network voice mail service, calling name delivery and caller identification.

Caller identification service as used herein is any service which provides some indication of the identity of an incoming call, typically the phone number from which the incoming call originated. This service includes but is not limited to the services referred to as Caller ID, Caller Name and Calling Number Identification (CLID). Generally, Caller ID is a service that provides the phone number of the caller to the phone or device being called. Caller Name is an enhancement of Caller ID service and provides the directory listing associated with the originating calling number. This enhancement can be provided by referencing the originating/incoming number against an electronic listing and determining the directory listing associated with the incoming number, assuming the incoming number is listed and is not blocked. This additional service provides an alternate indication of the identity of the caller. Presently. the information about incoming number and/or the directory listing associated with the incoming number is provided after the first and ring signaling the incoming call and requires that the phone to which the service is provided ring.

Referring again to FIG. 3, the local STP 26 may be connected to other network elements through a regional STP 32, which in turn, may be connected to a regional SCP 34. Both regional SCP 34 and local SCP 27 are connected via respective data links to a Service Management System (SMS) 35. The SMS 35 interfaces to business offices of the local exchange carrier and interexchange carriers.

In order to keep the processing of data and calls as simple as possible, a relatively small set of triggers is defined at the SSPs for each call. A trigger in the AIN is an event associated with a particular calling line that generates a packet to be sent to an SCP. The trigger causes the SCP to query its databases or Service Package Applications for processing instructions with respect to the particular call. The results of the query are sent back to the SSP in a response from the SCP 27 through STP 26. The return packet includes instructions to the SSP as to how to process the call. The instructions may be to take some special action as a result of a customized calling service or enhanced feature, such as caller identification. In response, the SSP moves through its call states, collects the called digits and generates further packets that are used to set up and route the call. Similar devices for routing calls among various local exchange carriers are provided by regional STP 32 and regional SCP 34.

As illustrated in FIG. 3, the AIN 21 also includes a Service Circuit Node 36 (SCN) which is also referred to herein as a Service Node (SN). SCN 36 includes voice and Dual Tone Multi-Frequency (DTMF) signal recognition devices and voice synthesis devices. In addition, a SCN 36 may include a rental service interface 38 for use in connection with the present invention as is explained further below. SCN 36 is connected to the local SCP 27 via data link 39 using an X.25 protocol and to the SMS 35 via a data link. In addition, SCN 36 typically is connected to one or more, but usually only a few, SSPs via Integrated Service Digital Network (ISDN) links as shown by the connection to SSP 22b.

Exemplary Provisioning of the Present Invention in an Exemplary Environment

As explained above, a customer may initiate a request for caller identification service by placing a call to a feature access code to indicate a request for caller identification service. To accommodate requests for caller identification services, an exemplary embodiment of the present invention provides for the recognition of two types of triggers at each of the Service Switching Points (SSPs) that are used in connection with the exemplary embodiment. With respect to the first type of trigger, each of the calling lines that may be used to request caller identification services at a particular SSP are provisioned with a special access code trigger which may also be referred to as a feature access code trigger. Preferably, this trigger is a Public Office Feature Code Trigger (POFC) that responds to a feature access code, for example an asterisk followed by two digits (*XX). Thus, a customer dials the feature access code, *XX, which triggers the SSP based on the recognition of the feature access code as a POFC trigger to initiate a query/response exchange with the SCP. Additional details regarding this POFC trigger are provided below in connection with FIG. 4.

With respect to the second type of trigger, each of the calling lines that may be used to request caller identification services at a particular SSP are provisioned with a Termination Attempt Trigger (TAT) in an idle state. As is explained in further detail below in connection with FIG. 4, when a caller identification service is to be applied to a calling line, then the SCP provides the appropriate SSP with an instruction to change the state of the TAT trigger for that calling line from the idle state to an active state. The effect of a TAT trigger on a calling line in the active state will be understood to those skilled in the art as causing a pause at the SSP serving the calling line in the processing of any communication received on or directed to the calling line number. The SSP pauses so as to query the SCP and receive a response with instructions as to further processing of the communication. In this manner, the SSP obtains the instructions for applying the caller identification service to the communication. When the caller identification service is to be removed from the calling line, then the SCP provides the appropriate SSP with an instruction to change the state of the TAT trigger for that calling line from the active state to the idle state. In the idle state, the TAT trigger does not cause a pause in the processing of a communication received on or directed to the calling line number.

An alternative approach is to activate the TAT trigger for every calling line. This approach may be taken with respect to the implementation of the present invention. But advantageously, this exemplary embodiment of the present invention avoids such costly use of AIN resources. This exemplary embodiment provides for a change in the state of the TAT trigger from idle to active when temporary notification service is to be applied to a particular calling line number. In this manner, only communications to which temporary notification service are to be applied are paused in their processing. Other communications are not delayed, overhead is not wasted in fruitless query/response exchanges, and unnecessary steps are not undertaken.

Exemplary Operation

Rental of Temporary Caller Identification Service

FIG. 4 is a timing/block diagram illustrating an exemplary method and system of operation of the present invention. This exemplary method and system is described in the context of a customer making use of the method and system to obtain temporary caller identification service. Assume the customer is using a telephone 24a which is connected by calling line 25a to SSP 22a. That is, SSP 22a serves the customer's calling line 25a. As explained in the exemplary provisioning description above, SSP 22a is provisioned such that it initiates a query/response exchange with SCP 27 on receipt of a feature access code based on a Public Office Feature Code (POFC) trigger. In addition, the customer's calling line 25a is provisioned with a Termination Attempt Trigger (TAT) in the idle state.

Also assume that the customer is interested in obtaining advanced caller identification service with respect to the calling line number associated with telephone 24a and corresponding calling line 25a, but only for the time that the customer is on vacation. As a result of the temporary nature in application of the caller identification service to the customer's calling line, the customer may be considered to be "renting" the service. As a first step in renting the service, the customer places a call from telephone 24a and calling line 25a by using a feature access code such as *XX. Where "XX" may be any set of numbers that can be dialed from a telecommunication device. As noted, an exemplary embodiment provides for the use of *XX based on the provisioning of the appropriate SSPs with a POFC trigger.

Still referring to FIG. 4, arrow 42 indicates that the feature access code is received with the communication in the SSP 22a serving the customer's calling line 25, and is recognized by the SSP 22a as an indicator of the special status of the communication. The solid line in arrow 42 and other arrows in FIG. 4 indicate that the communication is carried over voice links rather than data links. The feature access code triggers the SSP 22a to pause in the processing of the call and to obtain further instructions from other network elements. Referring to the example, the customer's call to the feature access code is received in SSP 22a which pauses in the processing of the communication to request instructions from SCP 27. As indicated by arrow 44, this request preferably takes the form of a query from SSP 22a to SCP 27. The dashed line in arrow 44 and other arrows in FIG. 4 indicate that the medium is a data link rather than a voice link and that the exchange of information is a data exchange.

As part of the SSP's query to the SCP 27 for processing instructions, the SSP 22a provides the SCP 27 with information relating to the communication. This information may be provided in a Transaction Capability Application Part (TCAP) message pursuant to the SS7 protocol. In particular, the SSP 22a provides the SCP 27 with communication information including the feature access code and the calling line number. In addition, the SSP 22a provides the SCP 27 with identification information. This identification information includes an Originating Point Code (OPC) or other identifier as appropriate.

In response to receiving the communication information and the identification information from the SSP 22a, the SCP 27 carries out certain functions. The SCP 27 looks up the meaning of the feature access code and this may be accomplished by looking up the code through use of a Service Package Application (SPA). Upon look up, the SCP 27 determines that the communication indicates that the customer desires to access the rental system with respect to the rental or other implementation of an advanced service, such as caller identification service. Based on this determination, the SCP further determines that the communication is to be routed to the Service Circuit Node (SCN) 36. Thus, as indicated by arrow 46, the SCP 27 provides a response with instructions to the SSP 22a to route the communication to the SCN 36.

As noted, the SCP 27 recognizes the feature access code as indication that the communication is a request for a special service, in particular, caller identification service. On the basis of this recognition, the SCP 27 retains an association between the calling line or the calling line number of the communication and the SSP 22a which originated the query to the SCP 27. The SCP 27 may retain this association in a database 30 or some other appropriate storage medium. Preferably, the SCP retains the Originating Point Code (OPC) associated with this communication in a database 30. This may be a database that is shared by Service Package Applications (SPAs) that are associated with SCP 27. The retention of this OPC may be accomplished through the use of a first SPA that is referred to herein as "SPA #1." Advantageously, the present invention preferably provides that the SCP 27 retains the association between the calling line number and the SSP 22a at this point in the processing of the communication. Retaining this association at this point in the call processing is advantageous because the SCP 27 otherwise does not have any information with respect to the relationship between an SSP and the calling lines or calling line numbers that the SSP serves. As is explained below, later in the processing of the caller's rental agreement, the SCP 27 may have to take steps to change the status in the TAT trigger for the customer's calling line 25a from idle to active so as to apply advanced caller identification services to the calling line 25a. So, it is an advantage that the SCP 27 has a method or system for keeping track of the association between the calling line number and its serving SSP. This exemplary embodiment may further provide that the SCP 27 retains the association between the calling line number and its serving SSP for a predetermined length of time. It should be understood that once the feature access code is entered, the SCP may save information regarding the calling party such as the calling party number, the calling party's Originating Point Code, the service(s) requested by the calling party, and a time stamp. After expiration of the predetermined length of time, this association may be erased.

Referring once more to FIG. 4, as indicated by arrow 48, upon receipt of the processing instructions from the SCP 27, the SSP 22a routes the communication over voice links in a conventional manner to the SCN 36. As indicated by arrow 50, the SCN 36 sends the calling party number to the SCP 37 so that the SCP may determine whether there is a rental agreement or a temporary record containing initial request information (initial request message). The SCP 27 responds accordingly depending on whether there is a rental agreement or an initial request message. Additional details regarding a rental agreement are discussed below. The SCP 27, in response to a request for an advanced service, makes a recognition of the communication as a request for a special service such as a request for rental of temporary caller identification service. This recognition may be accomplished through the use of other tables or databases as those skilled in the art will understand. This recognition also may be accomplished through the use of a third SPA that is referred to herein as "SPA #3." As part of this recognition, the SCP 27 may use SPA #3 to check whether a rental agreement is in place with respect to this customer, calling line or calling line number.

Referring still to FIG. 4, as indicated by arrow 52, on the basis of the recognition of the communication as a request for a special service, the SCP 27 provides the SCN 36, and preferably a second SPA "SPA #2," with processing instructions. These instructions include a direction to the SCN 36 to make an inquiry for or a collection from the communication for rental information regarding temporary advanced telecommunication services for the calling line number or an alternate phone number selected by the customer. In other words, the SCP 27 instructs the SCN 36 to obtain information from the caller about the temporary advanced telecommunication services the caller may be interested in renting and the terms therefor. These instructions may include a report to the SCN 36 that a rental agreement is already in place with respect to this customer, calling line or calling line number. In that case, the SCP 27 recognizes the communication as a request for a change to the rental agreement. Thus, the SCP 27 instructs the SCN 36 to obtain information from the caller about the changes to the temporary advanced telecommunication services the caller may be interested in and the terms therefor.

Referring again to FIG. 4, as indicated by arrow 54, in response to the instructions from the SCP 27 to collect the rental information or changes thereto, the SCN 36 proceeds with making an inquiry of the communication for rental information or changes thereto regarding the temporary advanced telecommunication service for the calling line number. The double head on arrow 54 indicates that an information exchange takes place between the caller 24a and the SCN 36. Referring to the example, the SCN 36 may use the rental service interface 38, also referred to as SPA #2, to ask questions of the customer and to provide the customer with information such as service options. The rental service interface 38 may provide an audio interaction, Dual Tone Multi-Frequency (DTMF) interaction, a data interaction or a video interaction with the caller. The rental service interface 38 may make the inquiry and take the responses in a menu-type format. The rental service interface 38 also may be used to collect and compile the rental information or changes thereto that are collected from the caller. The rental information or changes thereto that are collected may vary depending on the advanced service that is desired by the caller. For example, the rental information collected for advanced caller identification service may differ from the rental information collected for advanced caller identification service based on the different nature of these services. By way of analogy, the rental service interface 38 and the SCN 36 may be thought of as rental agent in this rental transaction with the customer.

The collected and compiled information may be referred to as a rental agreement because the information generally includes the terms regarding application of the temporary advanced telecommunication services to the calling line number. This rental agreement may provide that the rental information be compiled pursuant to a selected format or protocol. Thus, the rental agreement may include information as to the type of advanced telecommunication services that are to be provided, the phone line or number to which the advanced telecommunication services are to be provided, the account to which the fees for the services are to be billed, time limits for application of the services, etc. This information may be formatted into a selected protocol or arrangement. The customer may provide information that is collected as rental information and is used to create an agreement or incorporated into an existing rental agreement. For example, the customer may create a new agreement to provide advanced caller identification service to be applied to his calling line number while he is on vacation or alter an existing agreement to provide temporary caller identification services to a phone line and number at which the customer will be.

Referring again to FIG. 4, as indicated by arrow 56, after collection, the rental information and/or the rental agreement and changes thereto are provided by the SCN 36 to the SCP 27, and preferably to SPA #3. As appropriate, the rental service interface 38 may be used to convert the rental information and/or the rental agreement and changes thereto from the format that is used to interact with the caller to the format that is most appropriate for transmission to and use by the SCP 27 such as the X.25 protocol.

Upon receipt of the rental information and/or the rental agreement and changes thereto from the SCN 36, the SCP 27 may make a determination as to whether the telecommunication service requested or change requested by the caller is available. This determination may be made on the basis of the information in the rental information and/or the rental agreement. In addition, this determination may be made through the use of SPA #3 or the databases 30 that are maintained by the SCP 27. The SCP 27 is particularly well situated to make this type of determination because the SCP 27 typically includes Service Package Applications (SPAs) that are used by a telecommunications network to implement services or enhanced features. For example, the SCP 27 may check the appropriate SPA and the resources of the network to determine whether certain advanced services, specifically caller identification, may be applied to the customer's calling line number while he is on vacation. This determination step is an advantage of the present invention because it provides dynamic evaluation of the available resources of the service provider and the network and provides the caller with a response based on this evaluation. This way, if the resources are unavailable with respect to a caller's request, the caller is not left in limbo. Rather, the caller may be informed of the unavailability. On the other hand, if the resources are available, then the caller may be provided with assurances that the desired advanced telecommunication service is available.

Although the above example includes only one request for a single temporary advanced telecommunication service, it should be understood that a caller may request that multiple temporary advanced telecommunication services be provided. In that case, the rental information and/or rental agreement may include information with respect to the additional requested services. The SCP 27 checks with the appropriate SPAs and network resources as to whether any or all of the requested services may be applied to the caller's calling line number. Advantageously, the caller does not have to use a piecemeal approach with respect to the rental of services. Preferably, information from the caller is collected and consolidated through use of the rental service interface 38 in the SCN 36 in rental information or a rental agreement. The collected information in the form of the rental information or the rental agreement is used in a unified fashion. Thus, the present invention provides a "gateway" for the caller to a whole host of telecommunication services.

After the SCP 27 makes a determination that the advanced telecommunication service requested by the caller is available, then on the basis of the rental information or the rental agreement, the SCP 27, and preferably SPA #3, take steps to make an activation of the service(s) for the requested line number. As noted in the background, prior to this invention, there was no correlative information stored in the SCP 27 to keep track of which SSPs serve which calling lines. Prior to this invention, it would have been impossible for the SCP 27 to take steps to provide instructions with respect to the activation of a caller identification service for a particular line because the SCP 27 would not have had information as to where to provide the instructions.

Advantageously, an exemplary embodiment of the present invention provides a mechanism whereby the SCP 27 may provide activation instructions to the appropriate SSP. As explained above, when an SSP 22a initially receives a communication directed to the feature access code, the SSP 22a pauses in the processing of the communication and initiates a query/response exchange with the SCP 27. As part of the query, the SSP 22a provides the SCP 27 with identification information. The SCP 27 retains an association between the calling line or calling line number of the communication and the SSP 22a which originated the query to the SCP 27. Preferably, the SCP retains the Originating Point Code (OPC) associated with this communication in a database 30 that may be accessed by the SPAs of the SCP 27. Thus, at this point in the processing of the rental agreement for the customer, the SCP 27 may access this identification information, and in particular, may access the OPC to determine where to send the activation instructions. As indicated by arrow 58, the SCP 27 provides activation instructions to SSP 22a as the SSP that serves the calling line number associated with the communication. In this exemplary embodiment, the activation instructions include a directive to SSP 22a to change the status of the Termination Attempt Trigger (TAT) on the calling line associated with the communication from an idle state to an active state. The effect of the TAT trigger on the calling line in the active state causes a pause at the SSP 22a serving the calling line in the processing of any communication received on or directed to the calling line number. The SSP 22a pauses so as to query the SCP 27 and receive a response with instructions as to further processing of the communication. In this manner, the SSP 22a obtains the instructions for applying caller identification service to the communication. As indicated by arrow 60, the SSP 22a desirably provides confirmation of the activation of the TAT or other activation to the SCP 27. Although the term "activation" implies immediacy, those skilled in the art will understand that the activation instructions, including the change in status of the TAT from idle to active, may provide that such activation take place at a later time.

Preferably, the SCP 26 and in particular SPA #3 retain the rental information or rental agreement for a predetermined length of time. By retaining the rental information or rental agreement, the SCP 26 has this material available in case another call for temporary telecommunication service is placed by the caller during the predetermined length of time. For example, the customer may decide to extend his vacation. The customer may place a call to the feature access code and to interact with the rental system so as to extend the provision of temporary advanced caller identification services to his calling line or another desired line. As noted above, an exemplary embodiment of the present invention checks whether a rental agreement or other rental information is in place prior to collecting new or additional rental information. Preferably, the SCP 27 checks whether a rental agreement or rental information is in place before the SCP 27 provides the SCN 36 with collection instructions. If the SCP 27 finds that a rental agreement or rental information is in place, then the SCP 27 may provide the SCN 42 with collection instructions that specify that the SCN 36 collect the rental information based on an inquiry for a change in the rental information. After the SCN 36 collects the change in the rental information, the SCN 36 may prepare a change in the rental agreement regarding the temporary advanced telecommunication services for the desired line number. As before, the SCN 36 provides the rental information and/or rental agreement but with the change in the rental information and/or the rental agreement to the SCP 27. The SCP 27 then takes steps to bring about the change in service by providing change activation instructions to the switch serving the calling line number.

Advantageously, in an exemplary embodiment, the caller is provided with confirmation as to the activation of the service or to the change in the service. In particular, as indicated by arrow 62 in FIG. 4, the SCP 27 provides confirmation to the SCN 36 of the activation or of the change activation of caller identification service for the calling line number. The SCN 36 may then provide confirmation to the customer. For example, after caller identification service is activated with respect to the customer's calling line number, the SCP 27 provides a confirmation to the SCN 36 that such activation has taken place. The SCN 36, preferably through use of the rental service interface 38, may provide the customer with an announcement that confirms that activation had taken place pursuant to the terms of the rental agreement. This confirmation from the SCN 36 to the caller is illustrated as arrow 64 in FIG. 4.

After this rental of the advanced caller identification service, calls that are directed to the customer's calling line number or any other desired number selected by the customer are identified and saved pursuant to the customer's directions. For example, a communication that arrives at the SSP 22*a* that serves the customer's calling line number will be paused in its further processing based on the active state of the TAT trigger on the customer's calling line. The SSP 22*a* checks with the SCP 27 as to further processing of the communication. The SCP 27 accesses the rental agreement in its database or Service Package Application with respect to this calling line number and provides the SSP 22*a* with instructions based on that rental agreement. The SSP 22*a* then carries out the instructions with respect to the communication and identifies the source of the communication arriving at the SSP 22*a* that serves the customer's calling line number. Desirably, the identification information is saved so that it may be accessed by the customer. More desirable, the identification information is saved and sorted so that the customer can retrieve the identification information at the customer's convenience in a format preferred by the customer.

It should be noted that the customer may select the type of caller identification information that is provided by the system. For example, the customer may select to receive any of the following identifying information regarding incoming calls: a number only to identify the communication, the time the communication was received, the name associated with the number from which the communication was received, information as to whether the communication was made from a local or exchange, information as to whether the call was made for a calling line number that the customer has pre-identified as a priority number, etc. Additionally, the customer may select to receive a message in a voice mailbox identifying the name and/or calling number of the calling party. as well as other additional advanced telecommunication services It should also be noted that the customer may select and combine additional advanced telecommunication services. For instance, the customer may further select to be phoned at a particular number and receive an audible text-to-speech message identifying the name and/or calling party number of the calling party and a particular order in which a listing of names and/or numbers are provided.

Customer Initiated Termination of the Rental of a Caller Identification Service

The preceding section described an exemplary method and system of the present invention in the context of a customer making use of the rental system to obtain a temporary caller identification service. Generally, the same exemplary method and system may be used by a customer to terminate the rental of a temporary caller identification service, but with certain modifications in the steps and system. For example, assume the customer returns early from vacation and desires to terminate the rental of the advanced caller identification service that was applied to the customer's calling line number.

Referring to FIG. 4 again, as indicated by arrow 42, the customer places a call from his calling line 25*a* and directs the call to the feature access code. The SSP 22*a* triggers on the feature access code, pauses in the processing of the communication, and initiates a query/response exchange (arrows 44 and 46) with the SCP 27. The SCP 27 retains the identification information relating to the communication, including preferably the OPC, and provides the SSP 22*a* with instructions in a response to route the communication to the SCN 36. As indicated by arrow 48, the SSP 22*a* routes the communication to the SCN 36. The SCN 36 reads the calling line associated with the communication and initiates an information exchange (arrows 50 and 52) with the SCP 27. The SCP 27 checks with the appropriate database of the SPA and finds that a rental agreement is in place with respect to this calling line number. The SCP provides the SCN 36 with information to that effect. The SCN 36 then engages in an information exchange (arrow 54) with the customer and obtains information that the customer desires to terminate the rental of the caller identification service. As indicated by arrow 56, the SCN 36 provides this information as to the termination of the caller identification service to the SCP 27. The SCP 27 then initiates an exchange with the appropriate SSP 22*a* (arrows 58 and 60) based on the identification information that the SCP 27 had retained when it was initially queried by the SSP 22*a* about the communication. In the exchange, the SCP 27 provides the SSP 22*a* with instructions to change the status of the TAT trigger from active to idle. After the SCP 27 receives confirmation from the SSP 22*a* as to this change, then the SCP 27, in turn, provides confirmation to the SCN 36 as indicated by arrow 62. The SCN 36 then may provide confirmation to the customer that the caller identification service that had been applied to his calling line 25*a* has been terminated. Henceforth, communications directed to the customer's calling line number are not forwarded.

Termination of a Caller Identification Service Based on Expiration of a Rental Agreement In the previous section, an exemplary method and system is described with respect to customer termination of the rental of a caller identification service. But a caller identification service may be terminated based upon the expiration of a predetermined amount of time as specified in advance by the customer. As explained above, the SCP 26 and in particular SPA #3 retain the rental information or rental agreement with respect to the customer. This rental information or rental agreement may include information with respect to the length of time that caller identification services are to be applied to the customer's calling line. The SPA #3 may retain a flag with respect to this rental agreement that a time has been set for termination of the caller identification service. Thus, when a communication directed to the customer's calling line number is received and a query is made to the SCP 27 for processing instructions, the SCP 27 and in particular SPA #3 checks this flag to determine whether the set time has expired. If the set time has not expired, then the SCP 27 provides the SSP 22*a* with instructions with respect to the application of the caller identification services. If the set time has expired, then the SCP 27 provides the SSP 22*a* with instructions to route the communication without application of caller identification services. In addition, the SCP 27 and in particular SPA #3 send an instruction to the SSP 22a to change the status in the TAT trigger associated with the calling line number from active to idle. Further, the SCP 27 and in particular SPA #3 remove or otherwise delete the rental agreement so that it is no longer retained with respect to the relevant line number. With the change in status of the TAT trigger on the calling line and with the deletion of the rental agreement, the line is no longer accorded caller identification services. Advantageously, the change in the status of the TAT trigger assures that wasteful query/response exchanges do not take place with respect to the line number, and deletion of the rental agreement frees up space in the database to service other temporary service requests.

Exemplary Embodiments of Caller Identification Service

Figure 5:
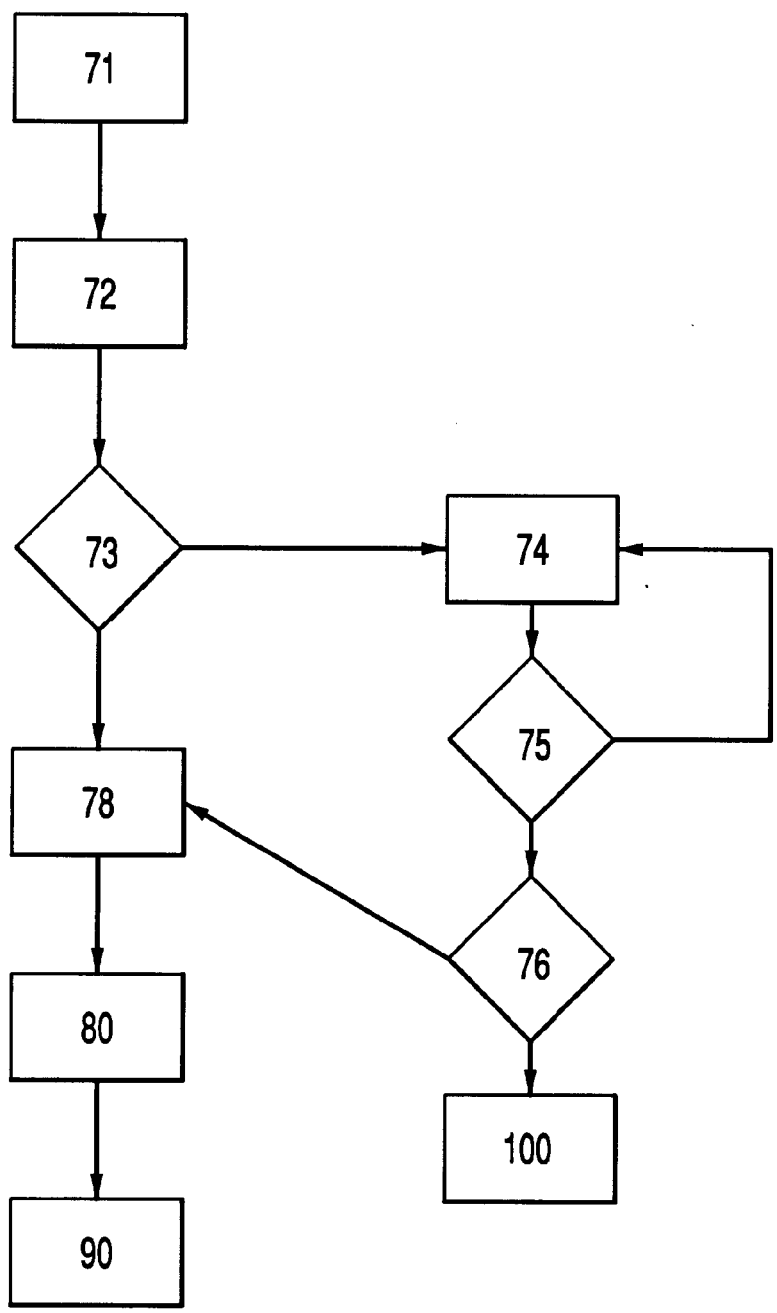
FIG. 5 is a flow diagram of an overview of an exemplary method and system of providing a customer-activated system of caller identification service.

An exemplary method and system of a customer-activated system of caller identification service is illustrated in FIG. 5. This exemplary method includes steps in which the customer can initiate, modify and receive caller identification service. The exemplary method begins in step 71 with a call from a customer or user of the system contacting the service provider/system via a special access code or service contact number provided by the service provider. The special access code or service contact number can be any phone number or access code and may be a number specifically for initiating caller identification services or a number for initiating and modifying advanced services in general. In this exemplary method, the special access code or service contact number for initiating or modifying caller identification service is the same special access code or service contact number used to retrieve caller identification data saved by the system. However, it is understood that the number or code for retrieving caller identification data saved by the system may differ from the number or code for initiating the caller identification service.

Upon receipt of the call, the system determines the phone number from which the customer is calling in step 72. Next, in step 73, the system determines whether there is an agreement in existence for the phone number from which the customer is by checking the appropriate database(s). Desirably, the system audibly also notifies the user, in step 73, as to whether there is an agreement to provide caller identification service to the phone number from which the customer is calling. If there is an agreement in existence, the system may proceed to step 76 or optional step 74. In optional step 74, the system inquires the customer for a password to determine whether the customer should have access to the caller identification data generated by the service and/or to modify the existing agreement. If this optional step is employed, the customer is required to enter a password to continue accessing the system. Next, in additional optional step 75, the system determines if the password entered by the customer is the password associated with the existing agreement for the phone number to which the service is provided and as determined in step 72. If the password is correct password the system proceeds to step 76. If the password is incorrect, the system desirably returns to step 74 and allows the customer to enter a password once more. Optional steps 74 and 75 add a security feature to the service and confirm that a user of the system should have access to the service thereby allowing the user to modify the service and obtain any saved caller identification information.

In step 76, the system makes an inquiry to determine if the customer desires to modify the existing caller identification service and accompanying agreement or to retrieve caller identification data stored by the system. If the customer desires to retrieve the caller identification data, the system proceeds to step 100 and provides the caller identification data. In a particularly desirable embodiment, the caller identification data is provided in an audible format selected by the customer. Additional steps may be included which allow the customer to select or alter the method and in which the caller identification data is provided. If, in step 76, the customer desires to modify the existing agreement, the system proceeds to step 78, or another analogous step, and inquires the customer for selections regarding modification of the service. These modifications may include but are not limited to: the time period for which the service is to be provided, the number of calls to be saved and identified, the type of caller identification information to be identified, saved, and provided by the system, the order in which the caller identification is to be provided by the customer. After receiving the customer's selections regarding modification or initiation of service, the system activates the caller identification service in step 80. Desirably, this service is provided in accordance with the information received from the customer in step 78. Next, the system may then confirm activation of the service in step 90. Desirably, the confirmation of caller identification service and the caller identification information is provided to the customer in an audible format.

Figure 6:
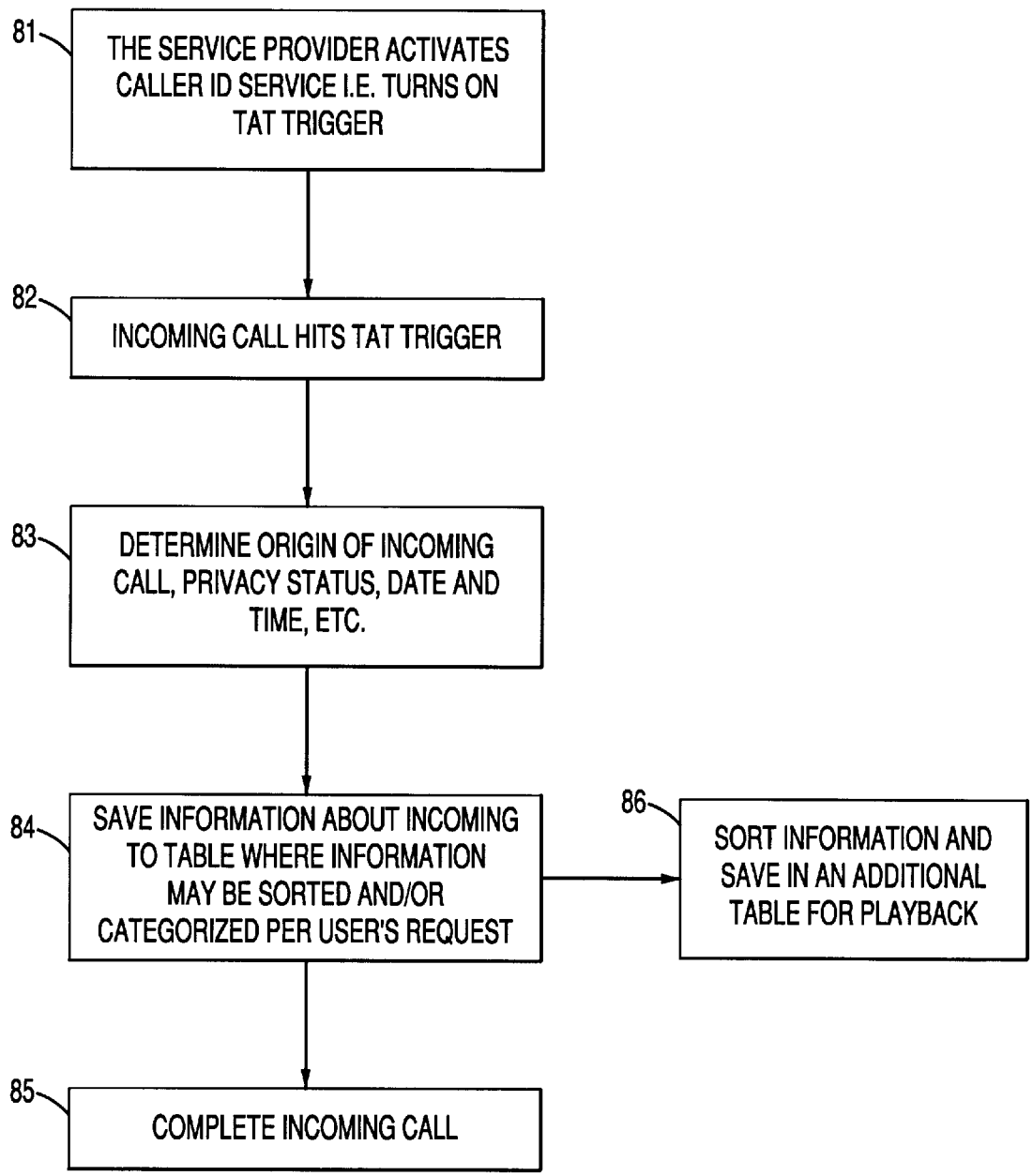
FIG. 6 is a flow diagram of an exemplary method of capturing and identifying calls in an AIN.

If an agreement is not in existence, the method proceeds from step 73 to step 78 and the system inquires the customer for information regarding initiating service. After receiving information/input from the customer regarding initiating or modifying caller identification service, the system then activates caller identification service, desirably in accordance with the customer's selections. The service provider/system activates caller identification service by activating a TAT trigger as outlined in the flow diagram of FIG. 6. FIG. 6 illustrates an exemplary method of capturing and identifying calls in an AIN. In step 81 of FIG. 6, the system activates caller identification by activating the TAT trigger associated with the phone line to which the service is to be provided, i.e. the phone line associated with the phone number form which the customer called to initiate caller identification service. Later, when a call hits the TAT trigger as in step 82, the service provider/system determines the origin of the incoming call, and optionally the date and time of the incoming call and the privacy status of the incoming call in following step 83. The system then saves information related to the incoming call and other, optional but desirable information, in a database in step 84. The information can be saved in any format. The information may also be sorted or categorized in step 84, before the call is completed in step 85. Alternatively, the information/data can be sorted and/or categorized after or contemporaneously with completion of the incoming call as illustrated in step 86 of FIG. 6.

Optionally, the system can determine if the incoming call is from a local exchange, a blocked number, and a number which the customer has designated as a priority or important number, etc. "This optional but desirable information can also be saved in a table or database. Information as to whether an incoming call was from a blocked number, from a local number and from a priority number may be stored in a table or database. Other tables and databases with additional information or alternative sorting strategies may be generated from the saved information."

Optionally, the saved data can be manipulated to provide additional services. For example, the calls can be prioritized as local versus long distance by comparing the saved, identified numbers to a table containing the Local Access Transport Area (LATA), i.e. a table containing the area codes local to the phone number to which the caller identification service is provided. By this optional sorting strategy, the customer can opt to have caller identification information for long distance calls provided first.

A distinct, optional advantage of the service is the ability to accept instructions from the customer as to the ways in which identified calls are organized and read back by the caller system. Again, any sorting and/or generation of other, optional information may occur before, but more desirably after the call is completed in step 85. Thus, avoiding delay in the completion of the call.

Overview of Caller Identification Service

In the above exemplary embodiments, the methods of providing a customer-activated system of caller identification service comprise the following advantages. By using the customer-activated system and method of caller identification service, the customer can select caller identification service for a temporary period without the purchase of any hardware. For example, the customer may select caller identification for a predetermined time period, e.g. one day, one month or an indefinite period whereby the customer may choose to terminate the service at a later, yet to be determined time. This method of caller identification service allows a customer to use caller identification service on a situational basis and without the purchase or installation of caller identification equipment. Additionally, the system can provide the customer with options as to how the caller identification information is organized and audibly provided to the customer. Further, the system can capture and identify information on all incoming calls, including incoming calls that are not completed because the monitored phone line is busy.

The customer initiates the caller identification service by contacting the service provider through the use of a service contact number, that is a phone number provided by the service provider to contact the service provider regarding such service, or an access number or an access code, such as *XX, also provided by the service provider to initiate, modify and/or retrieve caller identification services. As used herein, the term "service number" includes service contact numbers, access numbers and access codes. The customer dials the service number thereby contacting the service provider. Desirably, the system is automated and the service provider provides the customer with a menu of services wherein the menu of services may comprise a variety of advanced services including caller identification services. In this menu of services, the customer may select caller identification services as well as any other offered services including but not limited to the above described caller identification services.

The menu of services should also include a variety of related options. Thus, in addition to selecting caller identification service, the customer can select the period of time the service is to be provided, the phone line and number to which the service to be provided and billed, and the number of calls the customer desires to be saved and identified. The number of calls the customer desires to be saved and identified consists of a selected number of calls the customer desires the service provider to identify and save. For example, if the customer selects ten calls to be saved and identified, the service will save information as to the last ten incoming calls to the phone number and associated phone line to which the service is provided and erase any surplus information.

In response to the customer's selection(s), the service provider initiates caller identification service by installing or toggling a switch associated with the line to which service is to be provided. The switch enables the system to capture and identify all incoming calls as they are routed to the line to which the service is provided, before the call is completed. Thus, the method and system of capturing and identifying calls is passive and the incoming call proceeds through the phone system normally and without significant delay.

Preferably, the identification includes identifying the number of the incoming call, the time of the incoming call, as well as the privacy status of the incoming call, i.e. whether the identity of the incoming call is blocked from caller identification. In a preferred embodiment, the caller identification service not only identifies the saved incoming calls by audibly repeating the phone number from which the incoming call was made but also audibly identifies the call by a name associated with the phone number of the incoming call, such as "Harold Jones of (404)818-3700 called on May 27, 1998 at 1:13 PM." This caller identification service can be provided by having the system refer to directories and compare the identified number against the directories to determine the name associated with the identified number. The directories can include published phone directories and optionally, customized directories containing phone numbers which the customer has pre-identified by name and phone number. Another option advantage that may be provided by the service includes the ability of the service to be accessed by the customer to provide the phone number associated with any one of the published and/or pre-identified names. This additional feature can be provided by having the customer access the service and enter a desired name alphanumerically with a phone keypad. The service then refers to a directory, preferably a customized containing the customer's pre-identified names and numbers, and determines the number associated with the name requested by the user. The service can then audibly repeat the number associated with the requested name.

Another optional, advantage of the present invention allows the call back of a blocked number without divulging the blocked number. In this embodiment, the system will call back the blocked number for the customer at the customer's request without audibly repeating or otherwise divulging the blocked number to the customer. However, if the customer to which the service is provided has previously identified the name and number of a blocked number, the system may identify by the call by either or both name and number. For instance, if the customer knows a particular caller's name and number that is blocked and has entered that number into a database to which the system can refer, the system will identify that particular number.

In a still more preferred embodiment, additional features that may be provided by the service include the ability to save identified calls in table or list form and sort the calls per a preselected format or per the customer's immediate request. For instance, the calls may sorted according to but not the limited to any of the following preferences: listing the most recent calls first, listing long distance calls first, listing calls from phone number(s) that the customer has pre-identified as important first, etc. Such sorting can be achieved by conventional software. Thus, the method and system of the present invention are more interactive than current caller identification methods and systems. Still another optional feature of the invention includes the ability of the system to count the number of times a call from a particular is made to the line to which the service is provided and provided the information as to the number of times in a format such as "you received three calls from 555-1234 at 9:94 AM, 9:19AM and 8:34 AM," in lieu of providing three individual entries. Thus, the customer's time is saved and the customer is provided with more efficient service.

Additionally, the service provider may provide a caller identification service access number from which the customer may access the caller identification service and remotely retrieve caller identification service. This additional feature allows the customer to call the service access number from a phone line and number other than that to which the service is provided and remotely retrieve the caller identification from the service provider. For instance, if the customer calls from a phone line and number different from the phone line and number to which the service is provided, the customer enters the phone number to which the service is provided and to which the customer is requesting caller identification service. Desirably, the customer should also enter a password in addition to the phone number to verify that the customer should have access to the caller identification service. As is known in the art, the password may be preselected by the customer during the initiation of the service or assigned by service provider at the customer's request and may be later used to identify and/or authenticate the customer when accessing the service. Alternatively, the service provider may provide a feature code with which the customer may access the caller identification service and retrieve caller identification service from and for the phone line and number to which the caller identification service is provided.

In an AIN containing the elements as described above, the caller identification system provides the additional, unexpected advantage of allowing the caller identification service to save and identify incoming calls without the phone line and number to which the service is provided ringing. Thus, the caller identification system and method can save and identify incoming calls even when the phone number and line to which the service is provide is busy or in use and can capture one hundred percent of incoming calls. Thus, the system can be used as an adjunct or substitute for a message service or answering machine. For example, the system will save and identify an incoming call even though the incoming call was answered by someone or some apparatus that presumably took a message. The above-described examples illustrate that the present invention provides a caller-activated rental system for temporary advanced telecommunication services and methods therefor. By this invention, a customer does not have to rely on the service representative of a telecommunication service provider to set up and activate a caller identification service. Rather, the customer may place a call whenever the customer desires to activate or rent a caller identification service.

From the foregoing description of the exemplary embodiments of the present invention and operation thereof, other embodiments will suggest themselves to those skilled in the art. Therefore, the scope of the present invention is to be limited only by the claims below and equivalents thereof.

I claim:

1. In an advanced intelligent network, a method to provide a caller-activated rental system of caller identification service, comprising the steps of:
   A. receiving a communication directed to a feature access code on a calling line;
   B. in response to receiving the communication, making an inquiry of the communication for rental information regarding caller identification service for a selected phone line;
   C. in response to the inquiry, receiving rental information regarding caller identification service for the selected phone line; and
   D. in response to receiving rental information, activating caller identification service for the selected phone line,
   whereby the caller identification service with respect to the selected phone line may be rented by a caller who directs the communication to the feature access code and provides the rental information.

2. The method of claim 1, wherein Step D further comprises preparing a rental agreement regarding the caller identification service for the selected phone line.

3. The method of claim 1, wherein Step D further comprises placing a trigger or toggling an existing trigger on the selected phone line to identify incoming calls to the selected phone line; and
further comprising the step of:
   E. after activating the caller identification service for the selected phone line, providing confirmation of the activation of the caller identification service for the selected phone line.

4. In an advanced intelligent network, a method to provide a caller-activated change in caller identification, comprising the steps of:
   A. receiving a communication from a calling line directed to a feature access code;
   B. in response to receiving the communication from the calling line directed to the feature access code, determining whether a rental agreement is in place with respect to the calling line;
   C. if a rental agreement is in place, making an inquiry of the communication for a change in the rental agreement with respect to a selected phone line;
   D. in response to the inquiry, receiving a request for the change in the rental agreement; and
   E. in response to receiving the request for the change in the rental agreement, making the requested change in the caller identification service with respect to the selected phone line,
whereby the caller identification service with respect to the selected line may be changed by a caller who directs the communication to the feature access code and requests the change in the rental information for the selected phone line.

5. The method of claim 4, wherein Step E further comprises changing the rental agreement regarding the caller identification service for the selected phone line number.

6. The method of claim 4, further comprising the step of:
   F. after making the change in the caller identification service, providing a confirmation of the change activation in the change in the caller identification service.

7. A caller-activated rental system for caller identification services, comprising:
   an advanced intelligent network element operative:
      a. to make a recognition of a communication as a request for an initiation of caller identification service with respect to a calling line on the basis of use of a feature access code to which the communication is directed;
      b. to direct the collection of in formation regarding the caller identification service with respect to the calling line;
      c. to receive the information; and
      d. on the basis of the information, to direct activation of caller identification service for the calling line number.

8. In an Advanced Intelligent Network (AIN), a caller-activated rental system for caller identification services, comprising:
   A. a first AIN element operative to make a recognition of a communication as a request for an initiation of caller identification service with respect to a calling line number on the basis of use of a feature access code to which the communication is directed, and to direct collection by a second AIN element from the communication of information regarding the caller identification service for the calling line number;

B. the second AIN element being functionally connected to the first AIN element, the second AIN element being operative to make the collection of rental information from the communication regarding caller identification service for the calling line number, and to provide the rental information to the first AIN element; and C. the first AIN element being further operative, in response to receipt of the information, to make an activation of the caller identification service for the calling line number.

9. The system of claim 8, wherein the first AIN element is further operative, on the basis of the recognition of the communication, to retain an association between the calling line number and a Service Switching Point serving the calling line number.

10. The system of claim 9, wherein the first AIN element is further operative to use the association between the calling line number and he Service Switching Point serving the calling line number in the activation of the caller identification service for the calling line number.

11. The system of claim 8, wherein the second AIN element is further operative to prepare a rental agreement regarding caller identification service for the calling line number, and to provide the first AIN element with the rental agreement; and wherein the first AIN element is further operative to receive the rental agreement and on the basis of the rental agreement, to direct the activation of the caller identification service for the calling line number.

12. The system of claim 8, wherein the first AIN element is further operative to provide confirmation to the second AIN element of the activation of the caller identification service for the calling line number.

13. In an Advanced Intelligent Network (AIN), a caller-activated rental system for caller identification services, comprising:

A. a Service Switching Point (SSP) operative to receive a communication directed to a feature access code from a calling line number, and on the basis of the feature access code, to pause in the processing of the communication and to request instructions regarding the communication from a Service Control Point (SCP);

B. the Service Control Point being functionally connected to the Service Switching Point, and being operative to retain an association between the calling line number of the communication and the Service Switching Point;

to make a recognition that the communication is to be routed to a Service Circuit Node (SCN), and in response to the recognition, to provide instructions to the Service Switching Point to route the communication to the Service Circuit Node;

C. the Service Switching Point being further operative, in response to receipt of the instructions, to route the communication to the Service Circuit Node;

D. the Service Circuit Node being functionally connected to the Service Switching Point and to the Service Control Point, the Service Circuit Node being operative, in response to receipt of the communication to make a request for processing instructions from the Service Control Point;

E. the Service Control Point being further operative, in response to the request, to provide the Service Circuit Node with the processing instructions, the processing instructions including a direction to the Service Circuit Node to make a collection from the communication of rental information regarding caller identification service for the calling line number;

F. the Service Circuit Node being further operative, in response to the processing instructions, to make the collection from the communication of rental information regarding the caller identification service for the calling line number, and to provide the rental information to the Service Control Point;

G. the Service Control Point being further operative, in response to the rental information and on the basis of the association between the calling line number and the service switching point, to provide the Service Switching Point with activation instructions, the activation instructions including an order to the Service Switching Point to make an activation of caller identification service for the calling line number; and H. the Service Switching Point being further operative, in response to the activation instructions, to make the activation of caller identification service for the calling line number.

14. The system of claim 13, wherein the Service Circuit Node is further operative in response to the collection of the rental information, to prepare a rental agreement regarding caller identification service for the calling line number, and to provide the Service Control Point with the rental agreement instead of the rental information; and wherein the Service Control Point is further operative to receive the rental agreement and on the basis of the rental to provide the Service Switching Point with the activation instructions.

15. In a telecommunications system, a method to provide a customer-activated system of a caller identification service, comprising the steps of:

a service provider providing a service number wherein the service number allows the customer to contact the service provider regarding caller identification service;

a customer contacting the service number;

in response to the customer contacting the service number, the service provider providing a menu of services wherein the menu of services comprises a caller identification service;

in response to the service provider providing a menu of service, the customer selecting a caller identification service; and in response to the customer selecting a caller identification service, the service provider activating caller identification and providing an access number to the customer to access the caller identification service;

wherein the caller identification service comprises identifying and saving the calling number of an incoming call to the phone line to which the caller identification service is provided and wherein the customer accesses the caller identification of the incoming call by contacting the access number.

16. The method of claim 15, wherein the caller identification service further includes providing caller identification information organized other than solely by the time when the calls were received.

17. The method of claim 16, wherein the caller identification service includes providing caller identification prioritized by providing caller identification information for calls from priority callers or from non-local exchanges first.

18. The method of claim 15, wherein in response to the customer selecting a caller identification service, the service provider further providing the customer an option to select a time period for which caller identification service will be provided.

19. The method of claim 15, wherein the identifying and saving the calling number of an incoming call to the phone number to which the caller identification service is provided comprises identifying a name associated with the calling number of the incoming call.

20. The method of claim 15, wherein in response to the customer selecting a caller identification service, the service provider further providing an option for the customer to select a password to access caller identification service or to have the service provider assign a password to access caller identification service; and in response to the option for the customer to select a password to access caller identification service, the customer selecting a password to access the caller identification service or in response to the customer not selecting a password to access the caller identification service, the service provider assigning a password to the customer to access the caller identification service;

wherein the customer accesses the caller identification service by contacting the access number and providing the password to access the caller identification service.

* * * * *